(12) United States Patent
Kimura

(10) Patent No.: US 12,401,269 B2
(45) Date of Patent: Aug. 26, 2025

(54) SWITCH CIRCUIT FOR IMPLEMENT A SOFT START

(71) Applicant: WILL SEMICONDUCTOR (SHANGHAI) CO. LTD., Shanghai (CN)

(72) Inventor: Hiroyuki Kimura, Sendai (JP)

(73) Assignee: WILL SEMICONDUCTOR (SHANGHAI) CO. LTD., Shanghai (CN)

( * ) Notice: Subject to any disclaimer, the term of this patent is extended or adjusted under 35 U.S.C. 154(b) by 245 days.

(21) Appl. No.: 17/858,304

(22) Filed: Jul. 6, 2022

(65) Prior Publication Data

US 2023/0396148 A1    Dec. 7, 2023

(30) Foreign Application Priority Data

Jun. 2, 2022    (CN) .......................... 202210625184.5

(51) Int. Cl.
*H02M 1/36* (2007.01)
*G05F 1/46* (2006.01)
*H02M 1/08* (2006.01)

(52) U.S. Cl.
CPC .............. *H02M 1/36* (2013.01); *G05F 1/468* (2013.01); *H02M 1/08* (2013.01)

(58) Field of Classification Search
CPC ........ H02M 1/08; H02M 1/36; H02M 1/0058; H02M 3/158; H02M 1/088; H02M 1/0009; H02M 3/155; H02M 1/0029; H03K 17/166; H03K 17/162; H03K 17/163; H03K 17/16; H03K 17/687
See application file for complete search history.

(56) References Cited

U.S. PATENT DOCUMENTS

| | | | | |
|---|---|---|---|---|
| 5,698,973 | A * | 12/1997 | Goerke | G05F 1/575 323/901 |
| 6,188,212 | B1 * | 2/2001 | Larson | G05F 1/56 323/281 |
| 7,948,277 | B2 * | 5/2011 | Nakatake | H03K 17/168 327/109 |
| 8,427,802 | B2 * | 4/2013 | Yoshizawa | H02H 9/001 361/91.1 |
| 9,647,657 | B1 | 5/2017 | Bryson et al. | |
| 9,825,468 | B1 | 11/2017 | Bryson et al. | |

(Continued)

*Primary Examiner* — Gustavo A Rosario-Benitez
(74) *Attorney, Agent, or Firm* — MUNCY, GEISSLER, OLDS & LOWE, P.C.

(57) ABSTRACT

A switch circuit includes: a p-channel pass transistor, in which the source is connected to a power source and the drain is connected to a load; and a gate drive circuit, which is connected to the gate of the pass transistor. The gate drive circuit includes: a first transistor, through which a first current is made to flow by turn-on of an on/off signal; and an amplifier, in which a reference voltage corresponding to the first current is input to the negative input end, and a gate voltage of the gate is input to the positive input end, and which controls a gate current from the gate by an output from the output end in a manner that the gate voltage matches the reference voltage, and is capable of setting a maximum current of the output. A soft-on time from turn-on of the on/off signal to turn-on of the pass transistor is set by setting the maximum current according to the gate capacitance of the pass transistor.

5 Claims, 3 Drawing Sheets

(56) References Cited

U.S. PATENT DOCUMENTS

| | | |
|---|---|---|
| 10,432,175 B2 | 10/2019 | Choi et al. |
| 10,868,521 B2 | 12/2020 | Choi et al. |
| 2010/0052636 A1* | 3/2010 | Takagi .................... G05F 1/573 |
| | | 323/281 |
| 2010/0156367 A1* | 6/2010 | Takagi .................... G05F 1/618 |
| | | 323/282 |
| 2012/0081092 A1* | 4/2012 | Pavlin ...................... G05F 1/46 |
| | | 323/282 |
| 2013/0176008 A1* | 7/2013 | Li .......................... H02M 1/36 |
| | | 323/280 |
| 2015/0311692 A1* | 10/2015 | Hiyama .................. H02M 1/08 |
| | | 361/31 |
| 2019/0222201 A1* | 7/2019 | Wang .................... H03L 7/0995 |
| 2019/0310675 A1* | 10/2019 | Araragi .................. H02M 1/08 |
| 2022/0308609 A1* | 9/2022 | Koay ........................ H03F 3/16 |

* cited by examiner

SWITCH CIRCUIT FOR IMPLEMENT A SOFT START

BACKGROUND OF THE INVENTION

1. Field of the Invention

The disclosure relates to a switch circuit using a p-channel pass transistor disposed between a power source and a load.

2. Description of the Related Art

Conventionally, as a switch circuit for controlling a current from a power source to a load, a switch circuit using a pass transistor which is a metal-oxide-semiconductor field-effect transistor (MOSFET) is known.

Here, when an n-channel pass transistor is disposed at the power source side of the load, a voltage higher than the power source voltage is required to turn the pass transistor on and off. Thus, a charging pump or the like is required, which makes the configuration complicated.

Therefore, when the pass transistor is disposed at the power source side, it is preferable to use a p-channel MOSFET.

Moreover, when the pass transistor is turned on suddenly, an inrush current to the load is generated, and thus the pass transistor needs to be turned on gradually (soft-on), thus a circuit for the suitable soft-on is required.

SUMMARY OF THE INVENTION

A switch circuit related to the disclosure includes:
a p-channel pass transistor, in which the source is connected to a power source and the drain is connected to a load; and
a gate drive circuit, which is connected to the gate of the pass transistor, wherein
the gate drive circuit includes:
a first transistor, through which a first current is made to flow by turn-on of an on/off signal; and
an amplifier, in which a reference voltage corresponding to the first current is input to the negative input end, and a gate voltage of the gate is input to the positive input end, and which controls a gate current from the gate by an output from the output end in a manner that the gate voltage matches the reference voltage, and is capable of setting a maximum current of the output, and
a soft-on time from turn-on of the on/off signal to turn-on of the pass transistor is set by setting the maximum current according to the gate capacitance of the pass transistor.

According to the switch circuit related to the disclosure, the generation of an inrush current can be prevented by using the gate capacitance of a pass transistor, thereby implementing a soft start.

PREFERRED EMBODIMENT OF THE PRESENT INVENTION

Hereinafter, embodiments of the disclosure are described with reference to the drawings. Note that, the following embodiments do not limit the scope of the disclosure, and configurations obtained by selectively combining multiple examples are also included in the disclosure.

"Overall Configuration"

Figure 1:
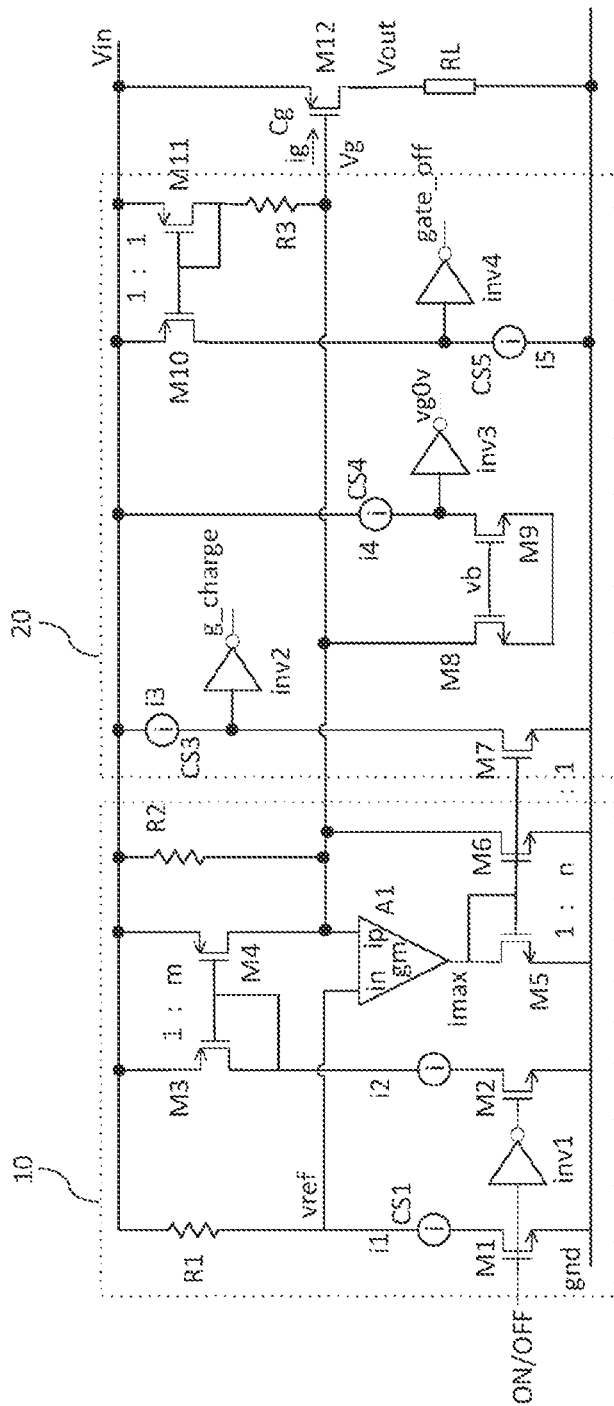
FIG. 1 is a circuit diagram showing an overall configuration of a switch circuit according to an embodiment of the present invention.

FIG. 1 is a circuit diagram showing an overall configuration of a switch circuit according to an embodiment of the present invention. A pass transistor M12 is turned on or off according to an on/off signal ON/OFF so as to control power supply to a load RL.

The source of the p-channel pass transistor M12 is connected to a power source Vin (power source voltage=Vin), one end of the load R1 is connected to the drain of the pass transistor M12, and the other end of the load RL is connected to a ground gnd. Therefore, the current from the power source Vin flows through the load RL by turning on the pass transistor M12. Note that, the pass transistor M12 is a p-channel MOSFET, and the drain is the output end Vout.

In the embodiment of the present invention, a gate drive circuit 10 and a monitor circuit 20 are provided as circuits for controlling the pass transistor M12.

<Gate Drive Circuit 10>

First, the gate drive circuit 10 will be described as following. One end of a resistor R1 is connected to the power source Vin, and the drain of an n-channel transistor M1 serving as a first transistor, is connected to the other end of the resistor R1 via a current source CS1. In addition, the source of the transistor M1 is connected to the ground gnd. A constant current i1 is made to flow by the current source CS1. Therefore, when the transistor M1 is turned on, the current i1 flows through the resistor R1 and the transistor M1. Note that, the current i1 is referred to as the first current.

The on/off signal ON/OFF is supplied to the gate of the transistor M1, and the gate of the transistor M1 is turned on or off according to the on/off signal ON/OFF.

The source of a p-channel transistor M3 is connected to the power source Vin, and the drain of an n-channel transistor M2 serving as a second transistor is connected to the drain of the transistor M3 via a current source CS2. In addition, the source of the transistor M2 is connected to the ground gnd.

A current i2 serving as the second current is made to flow by the current source CS2. Therefore, if the transistor M2 is turned on, the current i2 flows through the transistor M3 and also the transistor M2. The on/off signal ON/OFF is supplied to the gate of the transistor M2 via an inverter inv1, and the gate of the transistor M2 is turned on or off according to an inverted signal of the on/off signal ON/OFF.

Therefore, when the on/off signal ON/OFF is ON (at an H level), the transistor M1 is turned on and the transistor M2 is turned off, and when the on/off signal ON/OFF is OFF (at an L level), the transistor M1 is turned off and the transistor M2 is turned on.

The transistor M3 is short-circuited between the gate and the drain, and the gate of the transistor M3 is connected to the gate of a p-channel transistor M4 having the source connected to the power source Vin. Therefore, the transistor M3 and the transistor M4 constitute a current mirror. Here, the area ratio of the transistor M3 to the transistor M4 is 1:m, and m times the current i2 of the transistor M3, that is, a current m*i2, flows through the transistor M4.

The drain of the transistor M4 is input to the positive input end ip of a gm amplifier A1, and is connected to the gate of the pass transistor M12. A voltage vref of the connection point between the resistor R1 and the current source CS1 is input to the negative input end in of the gm amplifier A1. Therefore, the gm amplifier A1 operates in a manner that a voltage of the positive input end ip, that is, the gate voltage Vg of the pass transistor M12, becomes the voltage vref. Note that, the voltage vref is referred to as the reference voltage.

The drain of an n-channel transistor M5 is connected to the output end of the gm amplifier A1, and the source of the transistor M5 is connected to the ground gnd. The transistor M5 is short-circuited between the gate and the drain, and the gate of the transistor M5 is connected to the gate of an n-channel transistor M6 having the source connected to the ground gnd. Therefore, the transistor M5 and the transistor M6 constitute a current mirror. The drain of the transistor M6 is connected to the positive input end of the gm amplifier A1 and the gate of the pass transistor M12. Furthermore, a connection point of the drain of the transistor M6 with the positive input end of the gm amplifier A1 and the gate of the pass transistor M12 is connected to the power source Vin via a resistor R2. Therefore, the gate of the pass transistor M12 is pulled up to Vin when the gate current is not controlled. Furthermore, the area ratio of the transistor M5 to the transistor M6 is 1:n, and a current which is n times the current flowing through the transistor M5 flows through the transistor M6.

Here, the output current of the gm amplifier A1 flows through the transistor M5, and a current which is n times the output current of the gm amplifier A1 flows through the transistor M6, so that electric charges are extracted from the gate of the pass transistor M12, and accordingly the voltage of the positive input end ip decreases. Therefore, when the voltage of the positive input end ip is higher than vref, the output current increases, and a maximum value of the output current (=saturation current) of the gm amplifier A1 is defined as the current imax. Note that, the current imax is referred to as the maximum current. In addition, in this example, the voltage vref is set according to the gate voltage Vg at which the pass transistor M12 is fully turned on.

Therefore, when the on/off signal ON/OFF is ON, the current i1 flows, and the gate voltage Vg of the pass transistor M12 is sufficiently higher than the voltage vref, the gm amplifier A1 outputs the current imax. Therefore, the gate current ig=n*imax is extracted from the gate of the pass transistor M12 via the transistor M6.

On the other hand, if the on/off signal ON/OFF is OFF, the current i2 flows through the transistor M3, that is, if the gate voltage Vg of the pass transistor M12 is lower than the power source voltage Vin, the current i2 will flow through the transistor M3. Therefore, the gate current ig=m*i2 is supplied to the gate of the pass transistor M12 via the transistor M4.

<Monitor Circuit 20>

Next, the monitor circuit 20 will be described. First, a first monitor circuit will be described as following. The gate of an n-channel transistor M7 is commonly connected to the gates of the transistors M5 and M6 that constitute the current mirror, and the source of the transistor M7 is connected to the ground gnd. The area of the transistor M7 is the same as that of the transistor M5, and the current imax is made to flow by the transistor M7.

The drain of the transistor M7 is connected to the power source Vin via a current source CS3. And, the voltage of a connection point between the current source CS3 and the drain of the transistor M7 is output as a signal g_charge via an inverter inv2. A current i3 is set to be smaller than the current imax (imax>i3), when the current imax flows, the signal g_charge, which is the output of the inverter inv2 becomes the L level, and when no current imax flows, the signal g_charge becomes the H level.

A second monitor circuit will be described as following. The drain of an n-channel transistor M8 is connected to the gate of the pass transistor M12. The gate of an n-channel transistor M9 is connected to the gate of the transistor M8, and these gates are set to a voltage vb. The voltage vb is a voltage slightly higher than the threshold voltages of the transistors M8 and M9. In addition, the sources of the transistors M8 and M9 are connected to each other. And, the drain of the transistor M9 is connected to the power source Vin via a current source CS4, and the voltage of the connection point of the drain of the transistor M9 with the current source CS4 is output as a signal vg0v via an inverter inv3.

As described above, the voltage vb is set to a voltage slightly higher than the threshold voltages of the transistors M8 and M9. Therefore, generally, no current flows through the transistors M8 and M9, and the signal vg0v is at the L level.

On the other hand, when the on/off signal ON/OFF is ON and Vin<i1*R1, the gate voltage Vg becomes nearly a gnd level (0 V in this example) trying to allow the transistor M12 to be fully turned on. In this case, when the current flows via the transistors M9 and M8 and the current amount of the current is greater than that of a current i4, the signal vg0v becomes the H level.

A third monitor circuit will be described as following. The drain of a p-channel transistor M10 having the source connected to the power source Vin is connected to the ground gnd via a current source CS5. The voltage of a connection point of the drain of the transistor M10 with the current source CS5 is output as a signal gate_off via an inverter inv4. The gate voltage Vg of the pass transistor M12 is lower than that of the power source Vin by a predetermined value, and when the pass transistor M12 is turned on, the current flows through the transistors M11 and M10, and the signal gate_off becomes the L level. That is, by setting a resistor R3 to a value defined by the ratio of a potential difference between the threshold voltage of the gate of the transistor M12 and the threshold voltage of the transistor M11 to a current i5, the transistor M12 is turned off below a desired threshold voltage, and accordingly the signal gate_off becomes the L level.

"Drive Operation"

Figure 2:
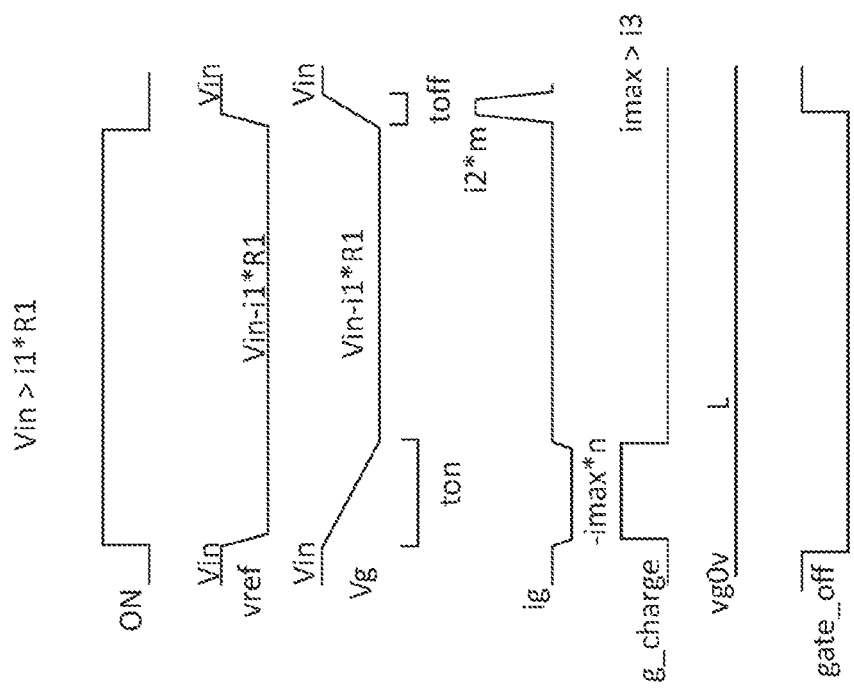
FIG. 2 is a timing chart showing the state of each part when Vin>i1*R1.

FIG. 2 is a timing chart showing the state of each part when Vin>i1*R1. First, if the on/off signal ON/OFF is OFF (at the L level), the transistor M1 is turned off and the transistor M2 is turned on. In this case, the voltage vref=Vin, Vg=Vin, and the gate current ig=0. In addition, when the current of the transistor M7 is 0, the signal g_charge is at the L level, when the current of the transistor M9 is 0, the signal vg0v is at the L level, and when the current of the transistor M10 is 0, the signal gate_off is at the H level.

In this state, when the on/off signal ON/OFF is ON (at the H level), the transistor M1 is turned on, the current i1 flows, and the voltage vref=Vin−i1*R1. Then, the voltage vref is input to the negative input end of the gm amplifier A1. The voltage of the positive input end of the gm amplifier A1 is Vin, and the current imax flows in the output of the gm amplifier A1. Therefore, the current of imax*n flows through the transistor M6, and is extracted from the gate of the pass transistor M12.

Here, the gate of the pass transistor M12 has a gate capacitance. The pass transistor M12 is a transistor that supplies a current to the load RL and has a relatively large gate capacitance Cg. At a stage that the on/off signal ON/OFF is OFF, the gate voltage is Vin, and the electric charge charged to the gate is Cg*Vin. Then, imax is output from the gm amplifier A1, and the current imax*n flows through the transistor M6, and is extracted from the gate of the pass transistor M12 (ig=imax*n). Then, the gate voltage Vg decreases from Vin to vref. Here, Vin−vref=i1*R1, and the soft-on time ton required for the gate voltage to change from Vin to vref can be expressed as follows.

$$ton = Cg*i1*R1/(i\max*n)$$

Note that, the maximum value of the gate-to-source voltage Vgs of the pass transistor M12 is i1*R1. In addition, capacitors may be separately connected in parallel between the gate and the source to adjust the capacitance between the gate and the source.

And, in a state that the gate voltage Vg=vref=Vin−i1*R1, the pass transistor M12 is fully turned on and supplies a current to the load RL.

Here, if Vgs<i1*R1, the output current of the gm amplifier A1 is imax, and the current of the transistor M7 is greater than the current 3. Therefore, the gate current ig=imax*n flows through the transistor M6, and accordingly the signal g_charge becomes the H level. Furthermore, the output current of the gm amplifier A1 becomes 0 at a stage that Vg=vref, and thus the signal g_charge becomes the L level. That is, the gate current is extracted from the gate of the pass transistor M12, and the pass transistor M12 becomes the H level in the time from being turned off to being turned on, that is, in the soft-on time.

The condition of this example is that a voltage decrease i1*R1 at the resistor R1 is less than the power source Vin (Vin>i1*R1). Therefore, the currents of the transistors M9 and M8 are never greater than the current i4, and the signal vg0v remains at the L level.

In addition, when the on/off signal ON/OFF becomes on, the gate current ig of the pass transistor M12 flows, and the gate voltage Vg starts to decrease, the current starts to flow through the transistor M11. The current is relatively small due to the resistor R3, and can be negligible for the gate current ig. Note that, the current flowing through the transistor M11 need not necessarily be set to a very small current, and in this case, the current amount in relation to the current imax may be taken into consideration. And, when the current flows through the transistor M11, the current flows through the transistor M10, and the current amount of the current is set to be greater than that of the current 5, and accordingly the signal gate_off becomes the L level.

Next, when the on/off signal ON/OFF becomes OFF, the transistor M1 is turned off, the current i2 flows through the transistors M2 and M3, and the current m*i2 flows through the transistor M4. Then, this current m*i2 is supplied to the gate of the pass transistor M12 (ig=m*i2), and the gate voltage Vg of the pass transistor M12 starts to rise. That is, the gate capacitance Cg is discharged until the gate voltage reaches Vin. Therefore, a soil-off time toff required for the gate voltage to change from vref to Vin can be expressed as follows.

$$toff = Cg*i1*R1/(i2*m)$$

Moreover, the gate voltage of the pass transistor M12 rises with the turn-off of the on/off signal ON/OFF, and accordingly the current of the transistor M11 decreases, and the signal gate_off becomes the H level. Note that, although the area ratio of the transistors M10 and M11 constituting a current mirror is set to 1:1 in this example, the disclosure is not limited thereto.

Figure 3:
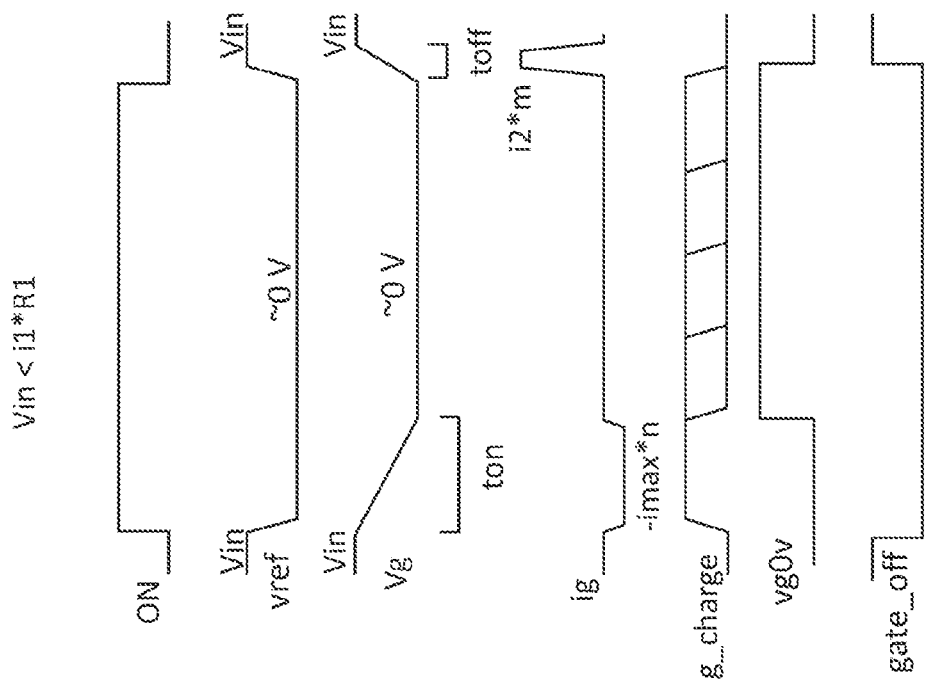
FIG. 3 is a timing chart showing the state of each part when Vin<i1*R1.

FIG. 3 is a timing chart showing the state of each part when Vin<i1*R1. In response to the turn-on of the on/off signal, the voltage vref and the gate voltage Vg of the pass transistor M12 intends to become Vin−i1*R1, but become nearly 0 V. In addition, in response to the turn-off of the on/off signal, the voltage vref and the gate voltage Vg of the pass transistor M12 return to Vin. The behaviors of the gate current ig and the signals g_charge and gate_off are also the same as that in FIG. 2.

Here, the current imax flows through the transistor M7 by the turn-off of the on/off signal ON/OFF, and accordingly the signal g_charge becomes the H level. And, the current imax becomes 0 by fully turning on the pass transistor M12. However, when Vin is sufficiently lower than i1*R1 (Vin<i1*R1), the transistor M12 still does not reach the full-on state even if the gate voltage Vg decreases to near 0 V. As a result, the g_charge indicating the state of being charged remains H. The reason is that the amplifier A1 compares vref which is the target with Vg, and when Vin is close to i1*R1, the determination of g_charge becomes uncertain due to the limit of the operation region near the gnd level (0 V in this example) of each element (M1, CS1, A1, M6). In FIG. 3, this uncertain state is indicated by a plurality of diagonal lines.

For example, the gate voltage Vg of the transistor M12 is constant at the gnd level, and thus no current flows through the transistor M12, but instead, the current flows towards the transistor M6. The reason is that the amplifier A1 defines that the output current is insufficient and outputs almost the current imax. Then, the current imax is output, and accordingly the current flows through the transistors M9 and M8, and the signal vg0v becomes the H level.

When the on/off signal ON/OFF becomes OFF, the transistor M6 is turned off, and the currents of the transistors M8 and M9 have nowhere to flow, then the drain voltage of the transistor M9 rises, and the signal vg0v returns to the L level.

The embodiment of the present invention includes the signal vg0v. Therefore, by gating the signal g_charge with an AND gate in which the signal vg0v is input to the other end, an erroneous output of the H level in the signal g_charge can be prevented.

What is claimed is:

1. A switch circuit, comprising:
a p-channel pass transistor, in which a source is connected to a power source and a drain is connected to a load; and
a gate drive circuit, which is connected to a gate of the pass transistor, wherein
the gate drive circuit comprises:
a first transistor, through which a first current is made to flow by turn-on of an on/off signal; and
an amplifier, in which a reference voltage corresponding to the first current is input to a negative input end, and a gate voltage of the gate of the pass transistor is input to a positive input end, and which controls a gate current from the gate of the pass transistor by an output from the output end of the amplifier in a manner that the gate voltage of the gate of the pass transistor matches the reference voltage, while the gate voltage is higher than the reference voltage, an output current of the amplifier increases, a maximum value of the output current is defined as a maximum current of the output of the amplifier, and a soft-on time from turn-on of the on/off signal to turn-on of the pass transistor is set by setting the maximum current according to a gate capacitance of the pass transistor.

2. The switch circuit according to claim 1, further comprising:
a second transistor, through which a second current is made to flow by turn-off of the on/off signal, wherein
a soft-off time from turn-off of the on/off signal to turn-off of the pass transistor is set by passing a current corresponding to the second current as a gate current to the gate.

3. The switch circuit according to claim 1, further comprising:
a first monitor circuit, which comprises a current mirror passing a current corresponding to the maximum current, and outputs a signal about the soft-on time by the current of the current mirror.

4. The switch circuit according to claim 1, further comprising:
monitor circuit, which outputs a signal if the gate voltage is nearly 0 V when the pass transistor is fully turned on.

5. The switch circuit according to claim 1, further comprising:
a third monitor circuit, which outputs a signal when the gate-to-source voltage of the pass transistor is less than a predetermined value.

\* \* \* \* \*